United States Patent [19]

Mimura

[11] Patent Number: 5,179,496
[45] Date of Patent: Jan. 12, 1993

[54] EXCITATION CURRENT DEVICE FOR AUTOMOTIVE ELECTROMAGNETIC CLUTCH

[75] Inventor: Munehiko Mimura, Himeji, Japan

[73] Assignee: Mitsubishi Denki K. K., Tokyo, Japan

[21] Appl. No.: 651,081

[22] Filed: Feb. 6, 1991

[30] Foreign Application Priority Data

Feb. 7, 1990 [JP] Japan ................................ 2-29132

[51] Int. Cl.⁵ ............................................. F16D 27/00
[52] U.S. Cl. ..................................... 361/154; 323/351
[58] Field of Search ........................ 361/152-154, 361/194, 205; 323/283, 351, 284; 307/350, 362, 270, 300; 192/84 R, 84 B

[56] References Cited

U.S. PATENT DOCUMENTS

| | | | |
|---|---|---|---|
| 4,520,282 | 5/1985 | Watanabe et al. | 307/491 |
| 4,535,276 | 8/1985 | Yokobori | 318/254 |
| 5,038,247 | 8/1991 | Kelley et al. | 361/154 |
| 5,072,165 | 12/1991 | Mimura | 318/558 |
| 5,083,273 | 1/1992 | Nishiwaki et al. | 364/424.1 |
| 5,094,333 | 3/1992 | Mimura | 192/84 R |

FOREIGN PATENT DOCUMENTS

| | | |
|---|---|---|
| 57-51530 | 3/1982 | Japan . |
| 62-31533 | 2/1987 | Japan . |
| WO79/00295 | 5/1979 | PCT Int'l Appl. . |
| 2135483 | 8/1984 | United Kingdom . |

Primary Examiner—A. D. Pellinen
Assistant Examiner—David Osborn
Attorney, Agent, or Firm—Sughrue, Mion, Zinn, Macpeak & Seas

[57] ABSTRACT

An excitation current control device for an automotive electromagnetic clutch includes a first and a second transistor 8 and 13 and a current detector resistor 14, coupled in series with the electromagnetic clutch. The first transistor is PWM controlled to control the amount of excitation current through the electromagnetic clutch. The second transistor turns off the excitation current in response to the disconnection signal for the electromagnetic clutch. The current detector amplifier 6 includes, in addition to an operational amplifier 61 and an input and a feedback resistor 63 and 62, an offset resistor 64 for offsetting the base current of the second transistor and the current flowing through a reverse excitation resistor 12 and the detector resistor 14. Alternatively, the offset correction for base current is effected by a software calculation.

7 Claims, 3 Drawing Sheets

EXCITATION CURRENT DEVICE FOR AUTOMOTIVE ELECTROMAGNETIC CLUTCH

BACKGROUND OF THE INVENTION

This invention relates to excitation current control devices for automotive electromagnetic clutches, which control the torque transmission of automotive electromagnetic clutches.

FIG. 1 is a circuit diagram of a conventional automotive electromagnetic clutch excitation current control device. The automotive electromagnetic clutch excitation current control device, comprising electromagnetic clutch excitation current calculation means 2 and supplied power from a current source 3, controls the excitation current supplied to an electromagnetic clutch 4 having an excitation coil 41 and a pair of contacts 42 and 43. The electromagnetic clutch excitation current calculation device 2, including an interface 21 and a microcomputer 22, obtains, from the running state control information SD and engine control information SE, digital instruction signal SID for the electromagnetic clutch excitation current. A D/A converter DA then obtains an analog instruction signal SIA for the electromagnetic clutch excitation current. An excitation current deviation amplifier 5 obtains a deviation of the electromagnetic clutch excitation current feedback signal SF of a current detector amplifier 6 with respect to the analog instruction signal SIA. In response to the deviation signal from the deviation amplifier 5, a PWM modulator 7 controls the ON-OFF operation of a first output transistor 8 controlling the excitation current supplied to the electromagnetic clutch 4. A reflux diode 9 and a quick-break diode 11 are coupled in series with the electromagnetic clutch 4 via output terminals T1 and T2 of the automotive electromagnetic clutch excitation current control device 1. Further, reverse excitation resistors 10 and 12 are coupled in series with the electromagnetic clutch 4 via the terminals T1 and T2. A second output transistor 13, the emitter of which is coupled to a current detector resistor 14 and the base of which is coupled to a voltage source via a base resistor 15, is always in the ON state during the time when the electromagnetic clutch is being connected in usual operation. The second output transistor 13 is turned off in response to an electromagnetic clutch open signal SO inputted to the base of a transistor 16 from the excitation current calculation means 2. The current detector 6, comprising an operational amplifier 61 and resistors 62 and 63, detects the voltage across the current detector resistor 14 corresponding to the excitation current through the electromagnetic clutch. When both the output transistors 8 and 13 are turned off, a reverse excitation current flowing in the direction opposite to that of the (normal) excitation current ic is supplied to the electromagnetic clutch via the reverse excitation resistors 10 and 12. The reverse excitation current is necessary for compensating for and eliminating the residual magnetization and torque.

As described above, the voltage across the current detector resistor 14 (which corresponds to the current flowing therethrough) is detected by the current detector amplifier 6 for the purpose of detecting the excitation current flowing through the electromagnetic clutch 4. The automotive electromagnetic clutch excitation current control device of FIG. 1 has therefore the following disadvantage.

When the output transistor 13 is being turned on, the base current IB of the transistor 13 flows through the current detector resistor 14 in addition to the excitation current ic through the electromagnetic clutch 4. Further, the current IC flowing through the reverse excitation resistor 12 also flows through the current detector resistor 14. Thus, the current IE through the current detector resistor 14 is given by:

$$IE = IC + IB + ic$$

Thus, the detected electromagnetic clutch current IE includes, in addition to the actual electromagnetic clutch current ic, an error $\Delta Ie$ equal to: $IC + IB$. For example, when IC is equal to 0.1 amperes, IB is equal to 0.2 amperes, and ic is equal to 4.0 amperes, IE is equal to 4.3 amperes, which thus includes an error of 7.5%. Thus, precise control of the electromagnetic clutch excitation current becomes impossible. In particular, the control of a small torque in the small current region cannot be effected with sufficient precision.

SUMMARY OF THE INVENTION

Thus, a primary object of this invention is to provide an automotive electromagnetic clutch excitation current control device which is capable of detecting the electromagnetic clutch excitation current precisely and thus is capable of controlling the electromagnetic clutch with enhanced precision and reliability.

The above object is accomplished in accordance with the principle of this invention by a control device for controlling an excitation current of an automotive electromagnetic clutch coupled across a voltage source, which comprises: a first transistor coupled in series with said electromagnetic clutch for controlling an amount of excitation current through said electromagnetic clutch; a second transistor coupled in series with said electromagnetic clutch and said first transistor, for turning off said excitation current in response to a signal for disconnecting said electromagnetic clutch; a current detector resistor connected in series with said electromagnetic clutch and said second transistor, wherein a base current of said second transistor flows through said current detector resistor in addition to said excitation current flowing through said electromagnetic clutch; current detector amplifier means for detecting current flowing through said current detector resistor, said current detector amplifier including offset means for offsetting and making correction for said base current of said second transistor, said current detector amplifier outputting a detection signal corresponding to the detected current; and control means for controlling excitation current through said electromagnetic clutch to a target value thereof in response to the detection signal of said current detector amplifier.

Preferably, said current detector amplifier means comprises: an operational amplifier having non-inverting and inverting inputs coupled across said current detector resistor; an input resistor inserted between said inverting input of the operational amplifier and a terminal of said current detector resistor; a feedback resistor coupled across an output and said inverting input of said operational amplifier; and an offset resistor coupled across a voltage source and said inverting input of said operational amplifier.

Usually, the control device comprises a reverse excitation resistor coupled in series with said current detector resistor across a voltage source and ground. Then, it is preferred that said offset means includes means for offsetting and making a correction for a current flowing through said reverse excitation current resistor and said current detector resistor.

Alternatively, the above object is accomplished by a control device for controlling an excitation current of an automotive electromagnetic clutch coupled across a voltage source, which comprises: a first transistor coupled in series with said electromagnetic clutch for controlling an amount of excitation current through said electromagnetic clutch; a second transistor coupled in series with said electromagnetic clutch and said first transistor, for turning off said excitation current in response to a signal for disconnecting said electromagnetic clutch; a current detector resistor connected in series with said electromagnetic clutch and said second transistor, wherein a base current of said second transistor flows through said current detector resistor in addition to said excitation current flowing through said electromagnetic clutch; current detector amplifier means for detecting current flowing through said current detector resistor, said current detector amplifier outputting a detection signal corresponding to the detected current; calculation means for calculating a target value of said excitation current in accordance with running and engine state information of an automobile, said target value offsetting and making a correction for said base current of said second transistor; deviation detector means, coupled to said calculation means and said current detector amplifier means, for detecting and outputting a deviation, with respect to said target value, of the current detected by said current detector amplifier means; and means for controlling said first transistor in response to said deviation detected by said deviation detector means so as to minimize said deviation.

BRIEF DESCRIPTION OF THE DRAWINGS

The features which are believed to be characteristic of this invention are set forth in the appended claims. This invention itself, however, may best be understood from the detailed description of the preferred embodiments, taken in connection with the drawings, in which:

In the drawings, like reference numerals represent like or corresponding parts.

DETAILED DESCRIPTION OF THE PREFERRED EMBODIMENTS

Figure 2:
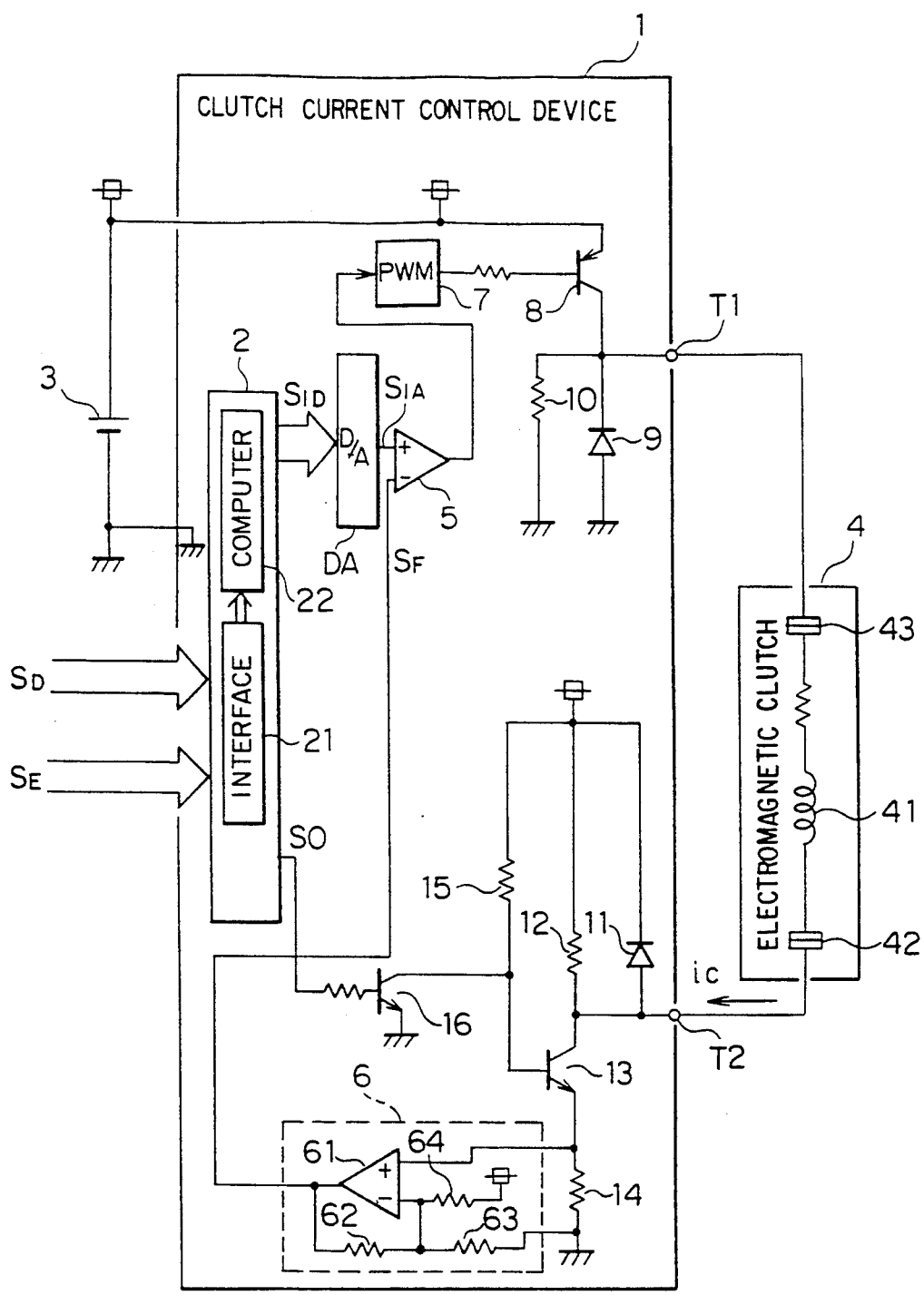
FIG. 2 is a circuit diagram of an electromagnetic clutch current control device according to an embodiment of this invention.

Referring now to FIG. 2 of the drawings, a first embodiment of this invention is described.

Figure 1:
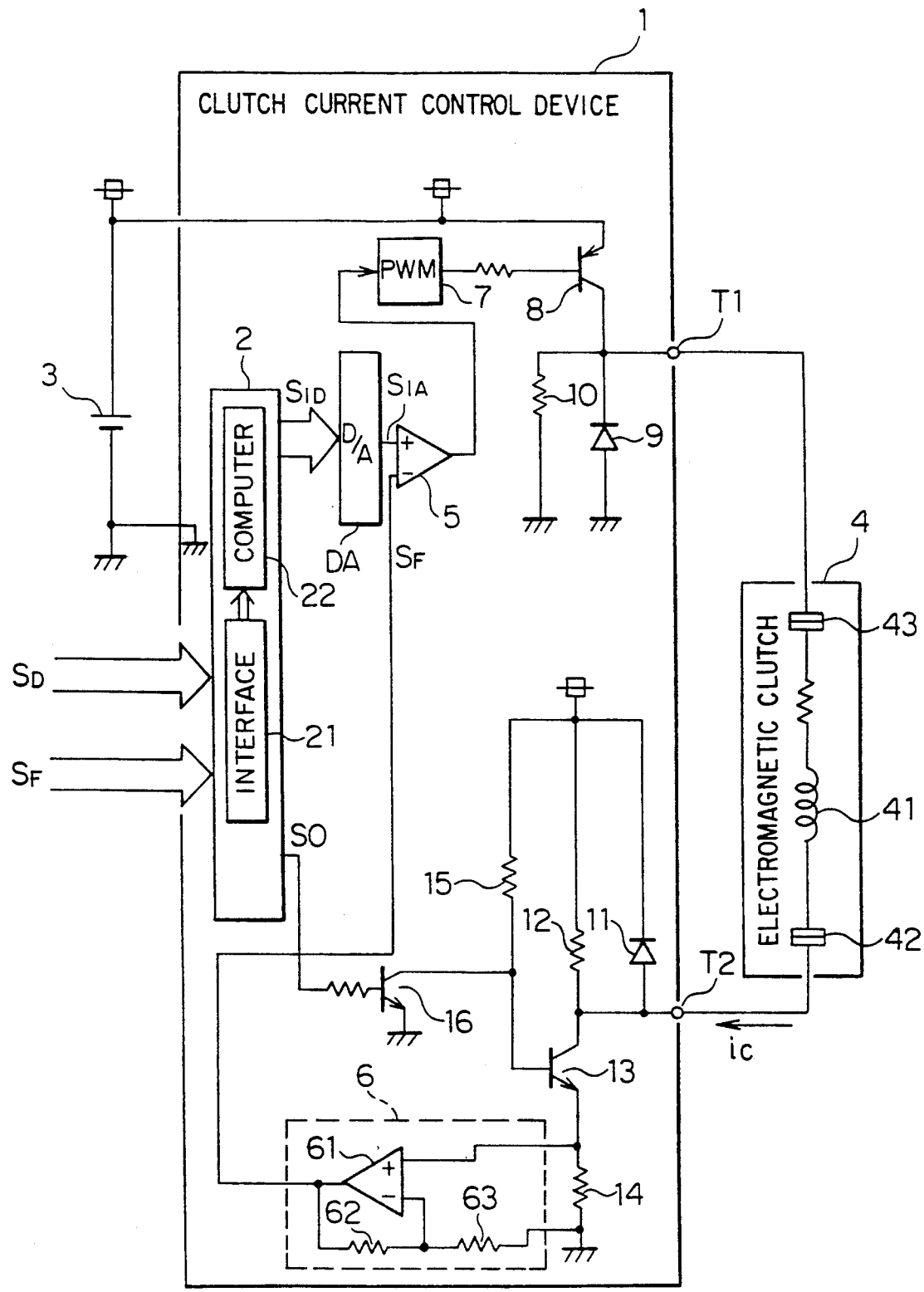
FIG. 1 is a circuit diagram showing a typical organization of an electromagnetic clutch excitation current control device.

The organization and method of operation of the automotive electromagnetic clutch excitation current control device of FIG. 2 is similar to those of the device of FIG. 1, except for the current detector amplifier 6. The detector amplifier 6 comprises, in addition to an operational amplifier 61 and serially connected resistors 62 and 63 the junction point of which is coupled to the inverting input of the operational amplifier 61, an offset resistor 64 for compensating for the error of the excitation current detection. The offset resistor 64 is coupled across a voltage source and the inverting input terminal of the operational amplifier 61. As in the device of FIG. 1, the non-inverting input terminal of the operational amplifier 61 is coupled to the non-grounded side of the current detector 14 resistor, while the inverting input terminal is coupled to the ground side of the current detector resistor via the resistor 63. The feedback resistor 62 is coupled across the inverting input and the output terminal of the operational amplifier 61.

The offset resistor 64 is effective in eliminating the error of the detected electromagnetic clutch current IE with respect to the actual current ic due to the inclusion of the base current IB of the output transistor 13 and the current IC through the reverse excitation resistor 12. Since the resistor 64 is connected to the junction between the resistors 62 and 63, it is effective not only in compensating for the variation of the source voltage but also in effecting an offset correction in conjunction with the resistors 62 and 63. The resistor 64 pulls up the level of the voltage at the inverting input terminal of the operational amplifier 61 by a predetermined amount corresponding to the sum of the currents IB and IC as defined above, such that the output of the operational amplifier 61 exactly corresponds to the actual excitation current ic rather than to the current IE flowing through the current detection resistor 14.

It is noted that the resistor 64 may be connected to the interior voltage source of the microcomputer, etc., when the variation of the voltage source level is small.

Figure 3:
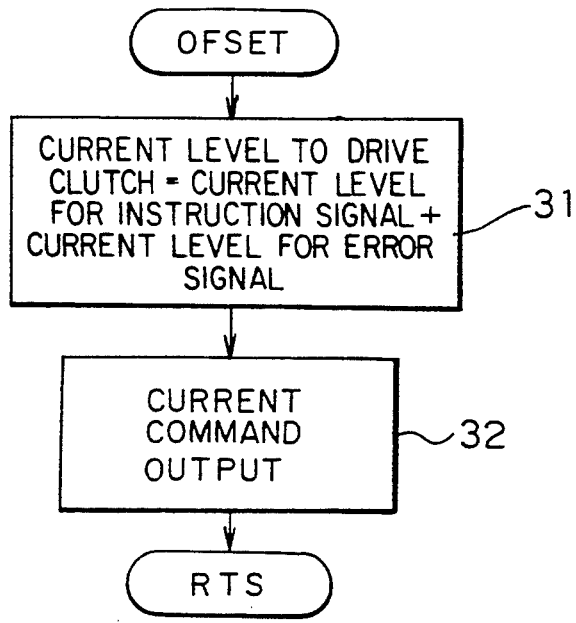
FIG. 3 is a flowchart showing a procedure followed by an electromagnetic clutch current control device according to another embodiment of this invention.

The correction of error of the excitation current detection may be effected by means of a program rather than by a physical circuit element (an offset resistor). According to a second embodiment of this invention, the correction of detection error of the electromagnetic clutch current is effected by means of a procedure shown in FIG. 3. The physical circuit organization of the automotive electromagnetic clutch excitation current control device according to the second embodiment is identical to that shown in FIG. 1, so that reference is made thereto in the following description. The method of operation of automotive electromagnetic clutch excitation current control device according to the second embodiment is as follows.

As described above, the current flowing through the current detector resistor 14 includes, in addition to the electromagnetic clutch excitation current ic flowing through the electromagnetic clutch 4, the base current IB of the transistor 13 and the current IC flowing through the reverse excitation current resistor 12. Thus, the current level IE corresponding to the output signal SF of the current detector amplifier 6 is given by:

$$IE = ic + \Delta Ie$$

where $\Delta Ie$ is:

$$\Delta Ie = IB + IC$$

Figure 4:
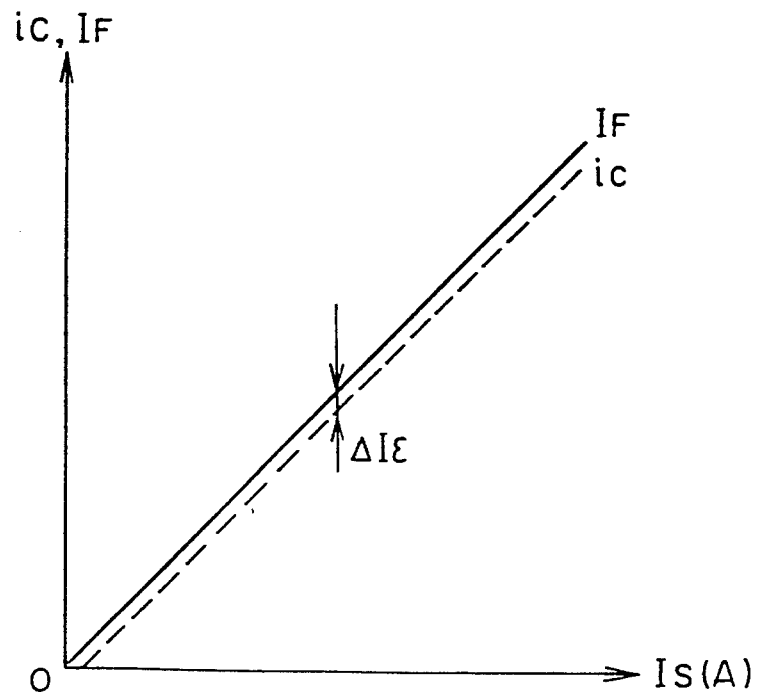
FIG. 4 is a graph showing the relationship between the instruction value and the actual value of the excitation current according to the embodiment of FIG. 3.

The microcomputer 22 of the electromagnetic clutch excitation current calculation means 2 receives the running state control information SD and the engine control information SE, and, in response thereto, calculates the digital instruction signal SID for the electromagnetic clutch excitation current. Let the level of current corresponding to the instruction signal SID be designated by IF. Then, as shown at step 31 in FIG. 3, the computer 22 calculates the current level IF by adding the magnitude of the above error ΔIe to the value IS corresponding to the signals SD and SF. Thus, as shown in FIG. 4, the level of current IF corresponding to the instruction signal SID becomes greater than the target electromagnetic clutch current level by an amount equal to the error ΔIe. Thus, the level of the analog instruction signal SIA and that of the feedback signal SF (which corresponds to the current IE flowing through the current detector resistor 14) of the current detector 6 are balanced and become equal to each other when the actual electromagnetic clutch current level ic is controlled to the target value thereof.

The PWM modulator 7 controls the excitation current through the electromagnetic clutch 4 in such a manner that the output of the deviation amplifier 5 is minimized. Thus, the excitation current through the electromagnetic clutch 4 is controlled to the precise target level exactly corresponding to the running state control information SD and the engine control information SE.

What is claimed is:

1. A control device for controlling an excitation current of an automotive electromagnetic clutch coupled across a voltage source, comprising:
   a first transistor coupled in series with said electromagnetic clutch for controlling an amount of excitation current through said electromagnetic clutch;
   a second transistor coupled in series with said electromagnetic clutch and said first transistor, for turning said excitation current on and off, in response to a base current applied to a base of said second transistor, thereby connecting and disconnecting said electromagnetic clutch;
   a current detector resistor connected in series with said electromagnetic clutch and said second transistor, wherein said base current and said excitation current of said second transistor flow through said current detector resistor when said second transistor is turned on;
   current detector amplifier means for detecting current flowing through said current detector resistor, said current detector amplifier means including offset means for eliminating an error component in the detected current flow caused by said base current applied to said second transistor, in order for said current detector amplifier means to output a detection signal corresponding only to an excitation current component of the current flowing through said current detector resistor; and
   control means for controlling excitation current through said electromagnetic clutch to a target value by controlling said first transistor in response to the detection signal of said current detector amplifier.

2. A control device as claimed in claim 1, wherein said control means comprises:
   calculation means for calculating a target value of said excitation current in accordance with running and engine state information of an automobile;
   deviation detector means, coupled to said calculation means and said current detector amplifier means, for detecting and outputting an amount of deviation between said target value and the excitation current detected by said current detector amplifier means; and
   means for controlling said first transistor in response to said deviation detected by said deviation detector means so as to minimize said deviation.

3. A control device as claimed in claim 1, wherein said current detector amplifier means comprises:
   an operational amplifier having non-inverting and inverting inputs coupled across said current detector resistor;
   an input resistor inserted between said inverting input of the operational amplifier and a terminal of said current detector resistor;
   a feedback resistor coupled across an output and said inverting input of said operational amplifier; and
   said offset means comprising an offset resistor coupled across a voltage source and said inverting input of said operational amplifier.

4. A control device as claimed in claim 1, further comprising a reverse excitation current resistor coupled in series with said current detector resistor across a voltage source and ground, wherein said offset means includes means for offsetting and making a correction for a current flowing through said reverse excitation current resistor and said current detector resistor.

5. A control device as claimed in claim 1, wherein said current detector amplifier means comprises:
   an operational amplifier having non-inverting and inverting inputs coupled across said current detector resistor; and said offset means comprising an offset resistor coupled between a voltage source and said inverting input of said operational amplifier, said offset resistor eliminating an error component of the detected current flow through said current detector resistor.

6. A control device for controlling an excitation current of an automotive electromagnetic clutch coupled across a voltage source, comprising:
   a first transistor coupled in series with said electromagnetic clutch for controlling an amount of excitation current through said electromagnetic clutch;
   a second transistor coupled in series with said electromagnetic clutch and said first transistor, for turning on said excitation current in response to a base current applied to a base of said second transistor in order to connect said electromagnetic clutch;
   a current detector resistor connected in series with said electromagnetic clutch and said second transistor, wherein said base current and said excitation current of said second transistor flow through said current detector resistor when said second transistor is turned on;
   current detector amplifier means for detecting current flowing through said current detector resistor, said current detector amplifier means outputting a detection signal corresponding to the detected current;
   calculation means for calculating a target value of said excitation current in accordance with running and engine state information of an automobile, said calculating means adding an offset value to said target value in order to correct for said base current of said second transistor;
   deviation detector means, coupled to said calculation means and said current detector amplifier means, for detecting and outputting a deviation, with respect to said target value, of the current detected by said current detector amplifier means; and means for controlling said first transistor in response to said deviation detected by said deviation detector means so as to minimize said deviation.

7. A control device as claimed in claim 6, further comprising a reverse excitation current resistor coupled in series with said current detector resistor across a voltage source and ground, wherein said target value offsets and makes a correction for a current flowing through said reverse excitation current resistor and said current detector resistor, in addition for said base current of said second resistor.

* * * * *